(12) United States Patent
Koenck et al.

(10) Patent No.: US 9,874,931 B1
(45) Date of Patent: Jan. 23, 2018

(54) HEAD-TRACKING SYSTEM AND METHOD

(71) Applicant: Rockwell Collins, Inc., Cedar Rapids, IA (US)

(72) Inventors: Steven E. Koenck, Cedar Rapids, IA (US); Bobby D. Foote, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 200 days.

(21) Appl. No.: 15/050,208

(22) Filed: Feb. 22, 2016

(51) Int. Cl.
*G02B 27/01* (2006.01)
*G06F 3/01* (2006.01)

(52) U.S. Cl.
CPC .......... *G06F 3/012* (2013.01); *G02B 27/0172* (2013.01); *G02B 2027/014* (2013.01); *G02B 2027/0141* (2013.01)

(58) Field of Classification Search
CPC .............................. G06F 3/011; G06F 3/0346
See application file for complete search history.

(56) References Cited

U.S. PATENT DOCUMENTS

| | | | |
|---|---|---|---|
| 5,645,077 A | 7/1997 | Foxlin | |
| 5,812,257 A | 9/1998 | Teitel et al. | |
| 5,991,085 A * | 11/1999 | Rallison | G02B 27/017 345/8 |
| 6,162,191 A | 12/2000 | Foxlin | |
| 6,176,837 B1 | 1/2001 | Foxlin | |
| 6,311,129 B1 | 10/2001 | Lin | |
| 6,361,507 B1 | 3/2002 | Foxlin | |
| 6,377,401 B1 | 4/2002 | Bartlett | |
| 6,408,245 B1 | 6/2002 | An et al. | |
| 6,409,687 B1 | 6/2002 | Foxlin | |
| 6,449,559 B2 | 9/2002 | Lin | |
| 6,474,159 B1 * | 11/2002 | Foxlin | A61B 5/1114 73/488 |
| 6,480,152 B2 | 11/2002 | Lin et al. | |
| 6,658,354 B2 | 12/2003 | Lin | |

(Continued)

OTHER PUBLICATIONS

Pending unpublished U.S. Appl. No. 13/971,695 to Roggendorf, filed Aug. 20, 2013.

*Primary Examiner* — Bryan Earles
(74) *Attorney, Agent, or Firm* — Angel N. Gerdzhikov; Donna P. Suchy; Daniel M. Barbieri

(57) ABSTRACT

A head-tracking system includes a georeferenced head tracker (GHT) configured to provide georeferenced head position data, and a platform-referenced head-tracker (PRHT) configured to provide platform-referenced head position data. A controller is coupled with the GHT and the PRHT, and configured to be coupled with an avionic system configured to provide georeferenced aircraft position data. The controller includes a processor configured to access the georeferenced head position data, compare a current drift error of the GHT with a predetermined error threshold. When the current drift error is below the threshold, the processor transmits a signal indicative of the georeferenced head position data being a current georeferenced head position data. When the current drift exceeds the threshold, the processor access the georeferenced aircraft position-data, generates update data based on the platform-referenced head position data and the georeferenced aircraft position data, and updates the GHT at a known instant in time.

13 Claims, 4 Drawing Sheets

(56) References Cited

U.S. PATENT DOCUMENTS

| | | | |
|---|---|---|---|
| 6,681,629 B2 | 1/2004 | Foxlin et al. | |
| 6,738,714 B2 | 5/2004 | McCall et al. | |
| 6,786,877 B2 | 9/2004 | Foxlin | |
| 6,820,025 B2 | 11/2004 | Bachmann et al. | |
| 7,000,469 B2 | 2/2006 | Foxlin et al. | |
| 7,046,215 B1 | 5/2006 | Bartlett | |
| 7,266,446 B1 | 9/2007 | Pelosi | |
| 7,301,648 B2 | 11/2007 | Foxlin | |
| 7,395,181 B2 | 7/2008 | Foxlin | |
| 7,409,290 B2 | 8/2008 | Lin | |
| 7,640,106 B1 | 12/2009 | Stokar et al. | |
| 7,672,781 B2 | 3/2010 | Churchill et al. | |
| 8,019,538 B2 | 9/2011 | Soehren et al. | |
| 8,165,844 B2 | 4/2012 | Luinge et al. | |
| 8,953,154 B2 | 2/2015 | Galea et al. | |
| 8,965,736 B2 | 2/2015 | Horton et al. | |
| 2015/0317838 A1* | 11/2015 | Foxlin | G02B 27/06 345/633 |
| 2016/0047675 A1* | 2/2016 | Tanenhaus | G01C 25/005 702/104 |
| 2016/0273921 A1* | 9/2016 | Zhou | G01S 19/49 |

* cited by examiner

HEAD-TRACKING SYSTEM AND METHOD

BACKGROUND

Embodiments of the inventive concepts disclosed herein are generally directed to head-tracking systems and methods for providing georeferenced head position and/or orientation data.

Head worn displays (HWDs) with head-tracking systems are used in a variety of aircraft and ground vehicle applications to provide situational awareness information to pilots or other users. Georeferenced head-tracking determines the position and/or orientation of the head relative to the Earth, which enables display of symbology and imagery superimposed over the view of the scene. The potential improvement in situation awareness that can be provided by an augmented vision system is largely dependent on the accuracy and responsiveness of the head-tracking subsystems.

Georeferenced head-tracking is an important and challenging head-tracking function in head-worn display systems. Systems in the past have used a two-step approach, using a platform referenced head-tracking system whose output is mathematically combined with the position and orientation of the platform to compute an estimate of the head position and orientation referenced to the Earth. This approach is subject to accumulation of errors and time delay (latency) from the multiple sources, which degrades the accuracy and responsiveness of the output.

The accuracy, update rate, latency and jitter requirements for head-tracking systems for flight deck applications are challenging. Some existing solutions rely on various combinations of magnetic, optical and inertial tracker subsystems to attempt to meet these requirements. In spite of years of investment and effort, the performance of existing head-tracking systems is still in need of improvement.

SUMMARY

In one aspect, the inventive concepts disclosed herein are directed to a head-tracking system. The head-tracking system includes a georeferenced head tracker (GHT) configured to be associated with a head of a user and to provide georeferenced head position data. The GHT has a current drift error. The head-tracking system also includes a platform-referenced head-tracker (PRHT) configured to be associated with the head of the user and to provide platform-referenced head position data. A controller is coupled with the GHT and the PRHT, and configured to be coupled with an avionic system configured to provide georeferenced aircraft position data. The controller includes a processor coupled with a non-transitory processor-readable medium storing processor-executable code.

The processor-executable code, when executed by the processor, causes the processor to: (1) access the georeferenced head position data; (2) compare the current drift error of the GHT with a predetermined drift error threshold; (3) in response to the current drift error of the GHT being below the predetermined drift error threshold, transmit at least one signal indicative of the georeferenced head position data being a current georeferenced head position data; (4) in response to the current drift error of the GHT exceeding the predetermined drift error threshold, access the georeferenced aircraft position-data and generate update data based on the platform-referenced head position data and the georeferenced aircraft position data; and (5) update the GHT with the update data at a known instant in time.

In a further aspect, the inventive concepts disclosed herein are directed to a head-tracking system. The head-tracking system includes a georeferenced head tracker (GHT) configured to be associated with a head of a user and to provide georeferenced head position data, the GHT having a current drift error. The head-tracking system also includes an optical head-tracker (OHT) configured to be associated with the head of the user and to provide optical platform-referenced head position data and a magnetic head-tracker (MHT) configured to be associated with the head of the user and to provide magnetic platform-referenced head position data.

A controller is coupled with the GHT, the OHT, and the MHT, and configured to be coupled with an avionic system configured to provide georeferenced aircraft position data. The controller includes a processor coupled with a non-transitory processor-readable medium storing processor-executable code for causing the processor to: (1) access the georeferenced head position data and compare the current drift error of the GHT with a predetermined drift error threshold; (2) in response to the current drift error of the GHT being below the predetermined drift error threshold, transmit at least one signal indicative of the georeferenced head position data being a current georeferenced head position data; (3) in response to the current drift error of the GHT exceeding the predetermined drift error threshold, generate update data based on the georeferenced aircraft position data and at least one of: the optical platform-referenced head position data and the magnetic platform-referenced position data; and (4) update the GHT with the update data at a known instant in time.

In a further aspect, the inventive concepts disclosed herein are directed to a method of providing georeferenced head position data. The method includes accessing, by a processor executing processor-executable code stored in a non-transitory processor-readable medium, georeferenced head position data from a georeferenced head tracker (GHT) configured to be associated with a head of a user onboard a moving aircraft, the GHT having a current drift error. The method may also include comparing, by the processor, the current drift error of the GHT with a predetermined drift error threshold. The method may further include in response to the current drift error of the GHT being below the predetermined drift error threshold, transmitting, by the processor, a signal indicative of the georeferenced head position data being a current georeferenced head position data.

The method may also include in response to the current drift error of the GHT exceeding the predetermined drift error threshold: (1) accessing, by the processor, platform-referenced head position data from a platform-referenced head-tracker (PRHT) configured to be associated with the head of the user and georeferenced aircraft position data from at least one avionic system; (2) generating, by the processor, update data based on the platform-referenced head position data and the georeferenced aircraft position data; and (3) updating, by the processor, of the GHT with the update data at a known instant in time.

BRIEF DESCRIPTION OF THE DRAWINGS

Like reference numerals in the figures may represent and refer to the same or similar element or function. Implementations of the instant inventive concepts may be better understood when consideration is given to the following detailed description thereof. Such description makes reference to the annexed pictorial illustrations, schematics, graphs, drawings, and appendices, which are not necessarily to scale, and in which some features may be exaggerated and some features may be omitted or may be represented schematically in the interest of clarity. In the drawings.

DETAILED DESCRIPTION

Figure 1:
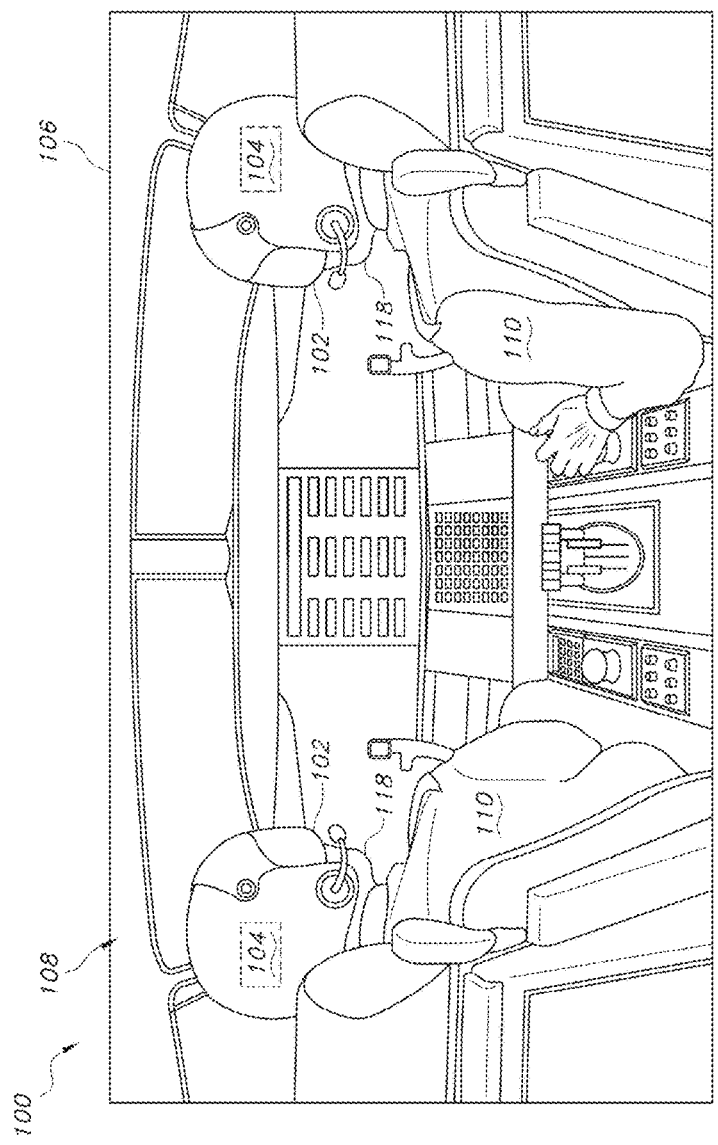
FIG. 1 is a diagram of an embodiment of a head-tracking system according to the inventive concepts disclosed herein shown incorporated in a head-worn display onboard an aircraft.

Before explaining embodiments of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

As used herein "aircraft" is intended to include vehicles, platforms, or projectiles travelling through the atmosphere, including but not limited to manned vehicles, unmanned vehicles, heavier-than-air vehicles, lighter-than-air vehicles, fixed wing aircraft, rotary wing aircraft, drones, and any other vehicles, platforms, or projectiles traveling through Earth's atmosphere. Further, the term "aircraft" is intended to include ballistic vehicles, booster vehicles, space vehicles, and atmospheric reentry vehicles to the extent such vehicles travel through Earth's atmosphere or orbit the Earth.

Finally, as used herein any reference to "one embodiment," "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment, and embodiments of the inventive concepts disclosed may include one or more of the features described herein, or any combination of sub-combination of two or more such features, along with any other features which may not necessarily be described or inherently present in the instant disclosure.

Broadly, embodiments of the inventive concepts disclosed herein are directed to head-tracking systems and methods configured to provide a georeferenced position and/or orientation of a user's head in an aircraft or other moving platform or vehicle such as space, terrestrial, marine, or submarine moving platforms or vehicles.

In some embodiments, a head-tracking system including an inertial measurement unit (IMU) is located directly on or otherwise associated with a head-worn display (HWD). The IMU is intrinsically georeferenced (to the extent the IMU is referenced to free-space and the Earth's movement causes slow and insignificant error which can be ignored for most applications), so changes in the position and orientation of the user's head are detected quickly and precisely to provide high-quality situation awareness information and to allow the HWD to provide conformal images and/or symbology. Since the IMU only detects movement from an initial position and orientation, and is subject to gradual drift over time, the IMU is initialized or updated and the reported position and orientation of the IMU is periodically updated from an external georeferenced source. In some embodiments, initialization and updates are accomplished by using a platform-referenced head-tracker and a platform Inertial Navigation System (INS), whose outputs are processed, timed or synchronized, and mathematically combined to provide highly accurate updates or corrections to the IMU. The result is a more accurate, lower latency indication of head orientation with respect to the Earth than is possible with a platform-referenced head-tracker alone.

Further, in some embodiments, head-tracking may be optimized for improved update rate, latency, and jitter for commercial applications. The requirements for military head-tracking are significantly more challenging in all respects, but particularly for accuracy over a full 4-Pi steradian field of regard. In some embodiments, georeferenced IMU head position data may be supported with one or more platform-referenced head-trackers such as a relatively narrow field-of-view, highly accurate forward-facing optical head tracker and/or a 4-Pi steradian magnetic head-tracker as described below. Further, in some embodiments, fault monitoring, detection, and notifications may be implemented to ensure accurate head position data is provided to users.

Referring now to FIG. 1, an embodiment of a head-tracker 100 includes a head-worn display (HWD) 102 and an embodiment of a head-tracking system 104 according to the inventive concepts disclosed herein deployed in a cockpit 106 of an aircraft 108. It is to be appreciated that in some cases, the HWD 102 may be omitted and the head-tracking system 104 may be implemented as a stand-alone head-tracking system 104 configured to provide georeferenced head position data to one or more aircraft or avionic systems and/or to one or more off-board systems. It is to be understood that while the head-tracker 100 is shown as being helmet-based, in some embodiments the head-tracker 100 may be implemented as a stand-alone head-worn display, headband, headphones, goggles, glasses, or combinations thereof.

The HWD 102 may be implemented as any desired head-worn display (e.g., monocular or binocular, digital night vision goggles, head-up display) which may be see-though, fully-immersive, or combinations thereof. The HWD 102 may be coupled with any desired avionic systems, such as a heads-up guidance system, a synthetic vision system, or other display generation system, and may be configured to provide georeferenced images, symbology, indications, or alerts to a user 110. In some embodiments, the HWD 102 may be a 2D-display, and in some embodiments the HWD 102 may be a 3D-display.

Figure 2:
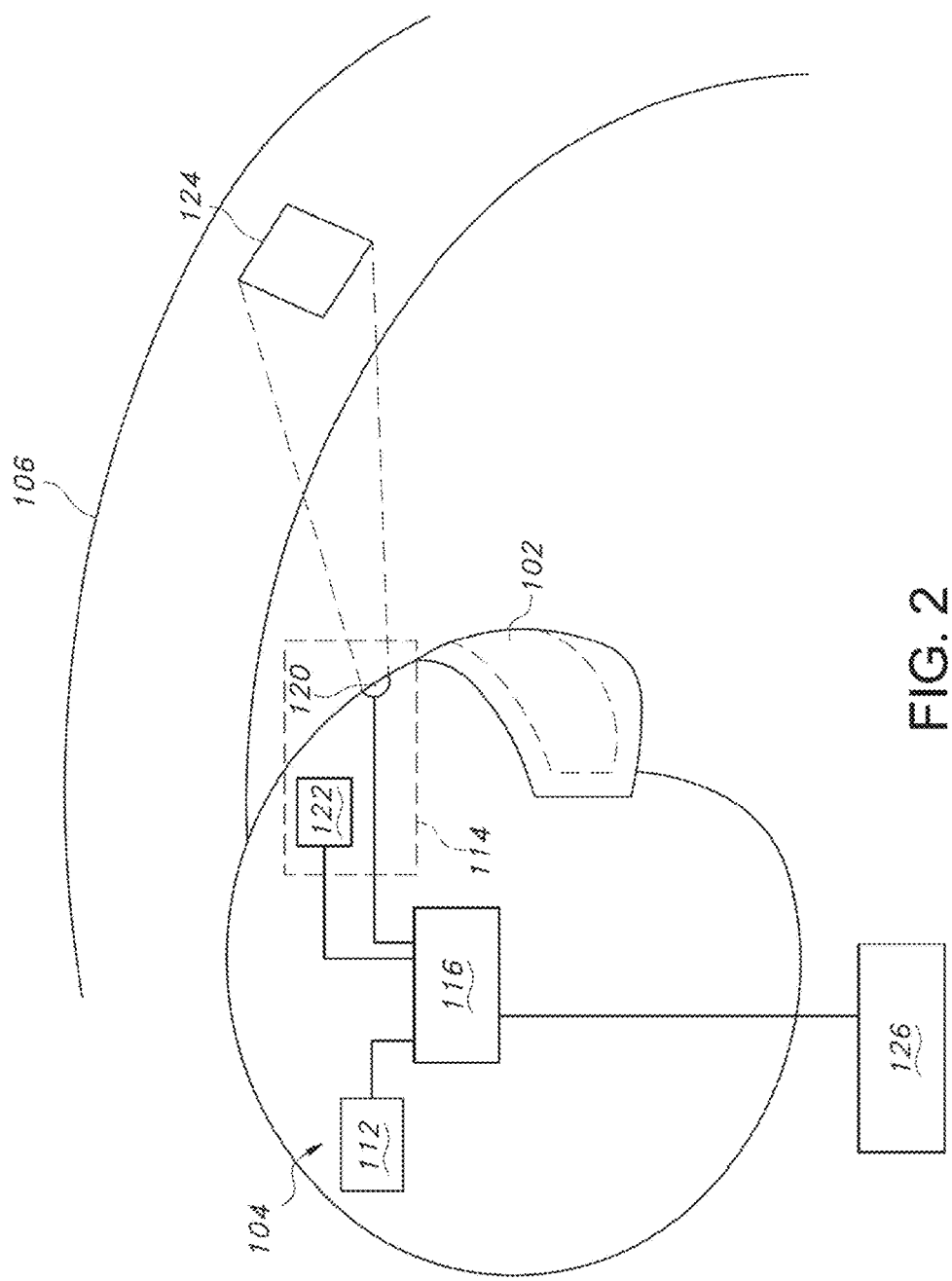
FIG. 2 is a diagram of the head-tracking system of FIG. 1.
Figure 3:
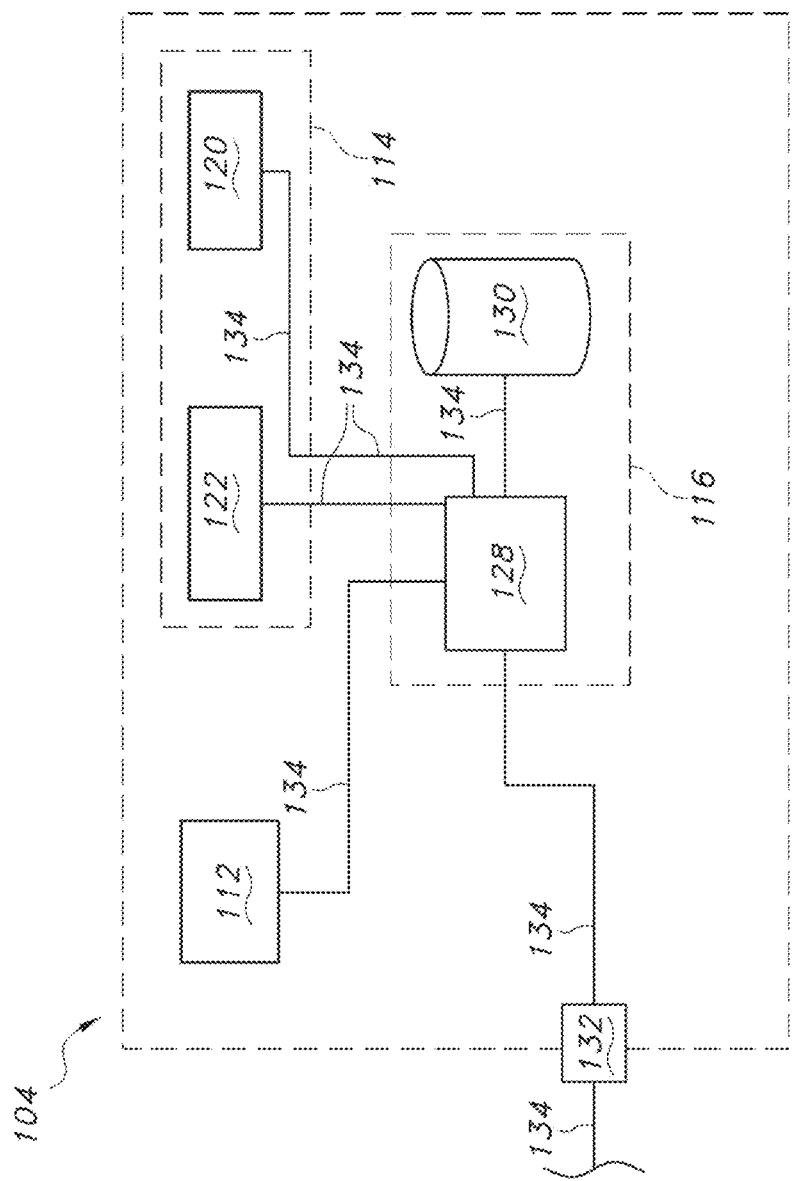
FIG. 3 is a block diagram of the components of the head-tracking system of FIG. 1.

Referring now to FIGS. 2-3, the head-tracking system 104 includes a georeferenced head-tracker (GHT) 112, a platform-referenced head-tracker (PRHT) 114, and a controller 116 coupled with the GHT 112, the PRHT 114, and the HWD 102.

The GHT 112 may be implemented as an inertial head-tracker such as one or more inertial measurement unit (IMU or IMUs) configured to determine a georeferenced position and/or orientation of a head 118 of the user 110. IMUs measure the spatial orientation of an object by numerical or other integration of sensed accelerations and rates of the object. As will be appreciated by persons of ordinary skill in the art, IMUs, while technically being referenced to free-space, can be considered intrinsically georeferenced, as any error introduced by the Earth's movement is relatively very slow and relatively very small or insignificant, and can be ignored for most inertial measurement unit applications, including head tracking. The GHT 112 is intrinsically geo-referenced and has a current drift error which is time-cumulative (e.g., the error increases over time elapsed from the last update of the GHT 112).

The initialization and periodic updates to the GHT 112 are accomplished by using the PRHT 114 and one or more avionic systems 126 (FIG. 2), such as an aircraft georeferenced position system, an aircraft GPS system, an aircraft inertial navigation system (INS), or other avionic systems, configured to provide data indicative of a georeferenced aircraft 108 position and/or orientation. Outputs from PRHT 114 and avionic systems 126 are processed, timed, and mathematically combined to provide highly accurate correction updates to the GHT 112.

The GHT 112 provides sufficiently accurate data for a certain period of time after being updated, and the data becomes inaccurate after a certain period of time elapses from the update of the GHT 112. To that end, a predetermined drift error threshold may be established by the controller 116. When the current drift error of the data provided by the GHT 112 is below the predetermined drift error threshold, the controller 116 may accept and report the GHT 112 data as the final georeferenced head position data. Conversely, when the data provided by the GHT 112 is at or above the predetermined drift error threshold, the controller 116 may update the GHT 112 as described below. The controller 116 may update the GHT 112 periodically, continuously, intermittently, in response to a predetermined event, in response to a user request or command, or combinations thereof. In some cases, the predetermined drift error threshold may be implemented as an amount or period of time elapsed from the last update of the GHT 112 after which the GHT 112 has to be updated again. In some cases, the GHT 112 may have a drift error of less than 1 milliradian (Mil) per 10 seconds.

The current drift error of the GHT 112 may be measured, determined, or estimated (e.g., by measuring the amount or period of time elapsed from the instant in time of the last known update of the GHT 112) and may be stored by the controller 116 and/or transmitted to one or more avionic systems 126 or remote processors. The GHT 112 may be redundant (e.g., triply redundant) to enable continued operation of the GHT 112 in the event of an IMU sensor failure, in some applications. The GHT 112 may include multiple sets of IMUs, each set configured with different ranges of maximum acceleration and rate sensing to provide both high resolution and increased dynamic range of operation. In some embodiments, multiple redundant IMUs or sets of IMUs may be implemented to capture head position data along all three axes (e.g., X, Y, and Z, or pitch, roll, and yaw). In some embodiments, the GHT 112 may include multiple IMUs with different scaling or sensitivity, to prevent oversaturating all of the IMUs at the same time, so as to continue providing data during fast and sharp maneuvers or when high acceleration forces are experienced by the GHT 112.

The PRHT 114 may be implemented as any desired platform-referenced head-tracker or combinations of platform-referenced head-trackers configured to provide a platform-referenced head position of the head 118 of the user 110. In some embodiments, the PRHT 114 may include one or more of an optical head tracker (OHT) 120, a magnetic head tracker (MHT) 122, or both an OHT 120 and MHT 122. The PRHT 114 is configured to determine or otherwise provide data indicative of a platform-referenced head position to the controller 116.

The OHT 120 may be implemented as an optical head-tracker (e.g., forward-facing) having a relatively narrow-field of view. The OHT 120 may be configured to detect an optical marker 124 (FIG. 2) positioned in the cockpit 106 (e.g., when the user 110 is facing forward), the optical marker 124 having a known location in the cockpit 106. It is to be understood that the optical marker 124 may be located at any desired known location in the cockpit 106, and in some cases more than one optical marker 124 may be implemented. Further, in some cases the optical marker 124 may be omitted, and one or more of the cockpit 106 features, such as displays, windows, glare shield, central windshield pillar, or combinations thereof, may be used as an optically-detectable marker. It is to be appreciated that the optical marker 124 may be detectable by the OHT 124 in any desired wavelength or group of wavelengths, such as, for example, visible, infrared, and ultraviolet.

In some embodiments, the OHT 120 may be implemented as or may include one or multiple forward-facing optical tracker(s), rear-facing optical tracker(s), 180° or 360° optical tracker(s), or combinations thereof. The OHT 120 is configured to provide optical head position data indicative of the platform-referenced position of the head 118 of the user 110 to the controller 116. In some embodiments, the OHT 120 may be omitted, or more than one OHT 120 may be implemented, such as two or more redundant OHTs 120, or two or more OHTs 120 facing in different directions or being offset along the X, Y, and Z axes.

The MHT 122 may be implemented as a magnetic head-tracker having a 4-Pi-steradian field of regard. The MHT 122 may be provided with an initial aircraft magnetic calibration map indicative of magnetic field data particular to the aircraft or the area surrounding the MHT 122, which may be static or may be updated by the controller 116 as described below. In some cases, the aircraft magnetic calibration map may be stored by the controller 116, and/or may be maintained by one or more aircraft systems 126 coupled with the controller. Further, in some cases the aircraft magnetic calibration map may be maintained to calibrate the MHT 122, and the aircraft magnetic calibration map may be static, or may be dynamically updated. In some embodiments, the MTH 122 may be omitted, or multiple redundant and/or offset MHTs 122 may be implemented. In some embodiments, one or more magnetic trackers may be attached to or otherwise associated with portions of the user's body, such as legs, feet, arms, hands, fingers, or combinations thereof, and may provide magnetic tracking data of such portions of the user's body while taking advantage of the aircraft magnetic calibration map and/or the calibrated MHT 122.

As shown in FIG. 3, the controller 116 includes at least one processor 128 operably coupled with a non-transitory memory 130 storing processor-executable code and/or data. The controller 116 is operably or communicatively coupled with the GHT 112, the PRHT 114 (e.g., with the OHT 120 and/or the MHT 122), and the HWD 102 such that the controller 116 may bi-directionally exchange data and/or signals with the GHT 112, the PRHT 114 (the OHT 120 and/or the MHT 122), and the HWD 102 via one or more I/O ports 132 and data paths 134 (i.e., data busses, wired connection, optical fiber connections, radio links). The controller 116 is further operably or communicatively coupled with one or more avionic systems 126 (FIG. 2), such as aircraft georeferenced position system, an aircraft GPS system, an aircraft INS, or other aircraft systems, configured to provide data indicative of a georeferenced aircraft position and/or orientation to the controller 116 and/or such that the controller 116 may bi-directionally exchange data and/or signals with the one or more avionic systems 126.

The processor 128 may be implemented as one or more of a digital signal processor, a central processing unit, a field-programmable gate array, and application-specific integrated circuit, a multi-core processor, or combinations thereof. The processor 128 is configured to execute processor-executable code and/or instructions stored in the memory 130, and to read, write, store, or otherwise manipulate data stored in the memory 130.

The memory 130 may be implemented as a non-transitory processor readable medium such as a hard drive, a flash drive, a read-only memory, a solid-state drive, or combinations thereof, and is configured to store data (e.g., as a data table, database, or data structure) and processor-executable code (e.g., in the form of software and/or firmware).

In operation, the head-tracking system 104 functions as follows. The GHT 112 determines a georeferenced position of the head 118 of the user 110 and provides data indicative of georeferenced head position to the controller 116. The GHT 112 provides data indicative of the georeferenced position of the head 118 at relatively low latency, high update rate, and low jitter, and at very high accuracy for a certain period of time limited by the drift error of the GHT 112. The georeferenced head position data provided by the GHT 112 is subject to inertial drift error and tends to lose accuracy over time. Provided that the current drift error is below the predetermined drift error threshold, the controller 116 may report the georeferenced head position data from the GHT 112 as the final georeferenced head position data to the HWD 102 and/or to the one or more avionic systems 126. Provided that the current drift error of the GHT 112 meets or exceeds the predetermined drift error threshold, the controller 116 may update the GHT 112 as described below.

The GHT 112 is updated by the controller 116, which may apply an error correction to compensate for the current drift error of the GHT 112. Error correction may be provided by the controller 116 in one or more of the following ways. In general, the PRHT 114 provides platform-referenced head position data to the controller 116. The controller 116 accesses platform position data from the avionic systems 126, and generates, based on the platform-referenced head position data and the platform position data, initialization or error-correction data, which is used by the controller 116 to update the GHT 112. The controller 116 reports the GHT 112 data (as periodically updated and as long as the inertial drift error is below the predetermined drift error threshold) as the final georeferenced head position data, which may be used by the HWD 102 to provide the user 110 with georeferenced images, georeferenced synthetic vision, and/or georeferenced or conformal symbology in some embodiments. The GHT 112 data is not compared to, or differenced with, the platform position data, rather, the platform position data and the platform-referenced head position data are merely used to generate the initialization or update data, which initialization or update data is used to update the GHT 112 and maintain the drift error below the predetermined drift error threshold. The update data may have an update magnitude, amount, or value, which may be expressed as a vector, coefficient, factor, number, multiplier, decimal, formula, function, or combinations thereof.

In some embodiments, the controller 116 monitors the time elapsed since the last update of the GHT 112, and based on the time since last GHT 112 update and the drift error of the GHT 112, the controller 116 determines whether the current GHT 112 drift error is below the predetermined drift error threshold, or equal to or greater than the predetermined drift error threshold as determined by the behavior and characterization of the IMU along with a predetermined operating or safety margin. For example, with currently available IMUs, and for most applications, the GHT 112 may be accurate enough such that the drift error is below the predetermined drift error threshold for approximately 10 seconds after an instant in time when GHT 112 is updated. It is to be understood that the drift error threshold may be determined depending on flight stage, mission objectives, user preferences, aircraft type, size, or load, or in any other manner. Over relatively short periods of time (e.g., 10 seconds or less) since the last update of the GHT 112, the GHT 112 georeferenced head position data is relatively highly accurate and may be considered to be below the predetermined drift error threshold by the controller 116 and provided as the final georeferenced head position data.

In some embodiments, where the PRHT 114 includes the OHT 120 and where the MHT 122 is omitted, malfunctioning, or data from the MHT 122 is not available, the OHT 120 may acquire a platform-referenced optical head position each time the user 110 faces in a direction such that the optical marker 124 is within the field of view of the OHT 120. The OHT 120 transmits data indicative of the platform-referenced optical head position to the controller 116. This data is then used by the controller 116 to update the GHT 112 as described above. That is, the controller 116 accesses platform position data from the avionic systems 126, and generates, based on the platform-referenced optical head position data from the OHT 120 and the platform position data, error-correction data, which is used by the controller 116 to update the GHT 112. The controller 116 reports the GHT 112 data (as periodically updated) as the final georeferenced head position data as described above.

In some embodiments, where the PRHT 114 includes the MHT 122 and the OHT 120 is omitted, malfunctioning, or data from the OHT 120 is not available, the MHT 122 may generate platform-referenced magnetic head position data indicative of the head 118 position over a full 4-Pi steradian field of regard and may transmit the platform-referenced magnetic head position data to the controller 116. The controller 116 uses the platform-referenced magnetic head position data to update the GHT 112. That is, the controller 116 accesses platform position data from the avionic systems 126, and generates, based on the platform-referenced magnetic head position data from the MHT 122 and the platform position data, update data having an update magnitude, which is used by the controller 116 to update the GHT 112. The controller 116 reports the GHT 112 data (as periodically updated) as the final georeferenced head position data.

In some embodiments, the MHT 122 may be provided with a magnetic calibration map indicative of magnetic field data particular to the aircraft 108. The magnetic calibration map may be static, or may be dynamically or periodically updated, and may be used by the MHT 122 to improve the accuracy of the platform-referenced magnetic head position data. Further, in some embodiments where the optical marker 124 is within the field of view of the OHT 120, optical head-position data from the OHT 120 may be used to update the calibration of the MHT 122.

In some embodiments, where the controller 116 determines that the current drift error of the data provided by the GHT 112 is below the predetermined drift error threshold, the controller 116 may use the inertial head position data to update the calibration and/or correct errors in the magnetic head position data and/or to generate and/or update a magnetic tracker correction table or the magnetic aircraft map. In such cases, the controller 116 may carry out continuous updates and refinement of the magnetic aircraft map to account for any variations in the magnetic environment in the aircraft 108. As will be appreciated by persons of ordinary skill in the art having the benefit of the instant disclosure, this calibration feedback loop provides the MHT 122 with improved accuracy of the orientation of the head 118 over the entire field of regard of the MHT 122.

Conversely, in response to determining that the current drift error of the GHT 112 meets or exceeds the predetermined drift error threshold, for example, because the orientation of the head 118 is outside of the field of view of the OHT 120, the controller 116 may rely on the magnetic platform-referenced head position data to continue to provide accurate head position data to the system 100. For example, during periods when the drift error of the GHT 112 exceeds the predetermined drift error threshold (e.g., based on the inertial drift error and the elapsed time since the last update of the GHT 112), the controller 116 may depend on the relatively slower platform-referenced magnetic head position data from the MHT 122 to continue to provide accurate head position data output. The output of the MHT 122 may be used to update the GHT 112 so that the controller 116 may return to "normal" inertial tracking which provides the desired high update rate, low latency, and low jitter. This provides continuous accurate head tracking even when the head 118 of the user 110 is not oriented within the operational range of the OHT 120 for an extended period of time (e.g., for longer than about 10 seconds).

In some embodiments, where the PRHT 114 includes both the OHT 120 and the MHT 122, or where data from both the OHT 120 and the MHT 122 is otherwise available to the controller 116 in addition to data from the GHT 112 and the aircraft systems 126, the head-tracking system 104 may utilize a continuous three-way calibration feedback loop as follows. Data from one or more of the OHT 120, the MHT 122, and the aircraft systems 126 may alone, or in combination with other data, be used to calibrate, initialize, or provide data correction to one or more of the GHT 112, the OHT 120, and the MHT 122. Loss of either the MHT 122 data or the OHT 120 data may cause reduction in accuracy of the system 100, but the system 100 may still be running based on the GHT 112 data, and may continue providing head position data.

For example, where the current drift error of the GHT 112 is below the predetermined drift error threshold, data from the GHT 112 may be reported as the final georeferenced head position data and may be used to calibrate and/or update the magnetic calibration map of the MHT 122, and data from the OHT 120 may be used to calibrate the GHT 112 and/or the MHT 122 (and/or update the magnetic calibration map). In cases where data from the GHT 112 is at or above the predetermined drift error threshold, data from either one, or both of the OHT 120 and the MHT 122 may be used to update the GHT 112, as well as one another (e.g., OHT 120 data may be used to calibrate the MHT 122 or update the aircraft magnetic calibration map).

Further, in some embodiments, the controller 116 may determine or access an update magnitude, update amount, or update value (e.g. expressed as a drift correction vector, or an error correction factor or coefficient of the update data), and may compare the update magnitude with a predetermined fault detection update magnitude threshold. In response to the update magnitude exceeding the predetermined fault detection update magnitude threshold, the controller 116 may determine a fault condition exists. The controller 116 may undertake one or more of a variety of actions, such as providing user notification, providing fault notification to one of more avionic system 126, providing a fault notification to a remote processor, reporting the last known good head position, not reporting or omitting faulty data, shutting down the head-tracking system 104, or combinations thereof. The controller 116 may continuously or intermittently monitor the data for faults. The fault detection update magnitude threshold may be determined based on the relatively error expected from a normally functioning system (e.g., a combination of the drift error of the GHT 112, and the error of the PRHT) at the applicable update rate (e.g., in Hz).

Figure 4:
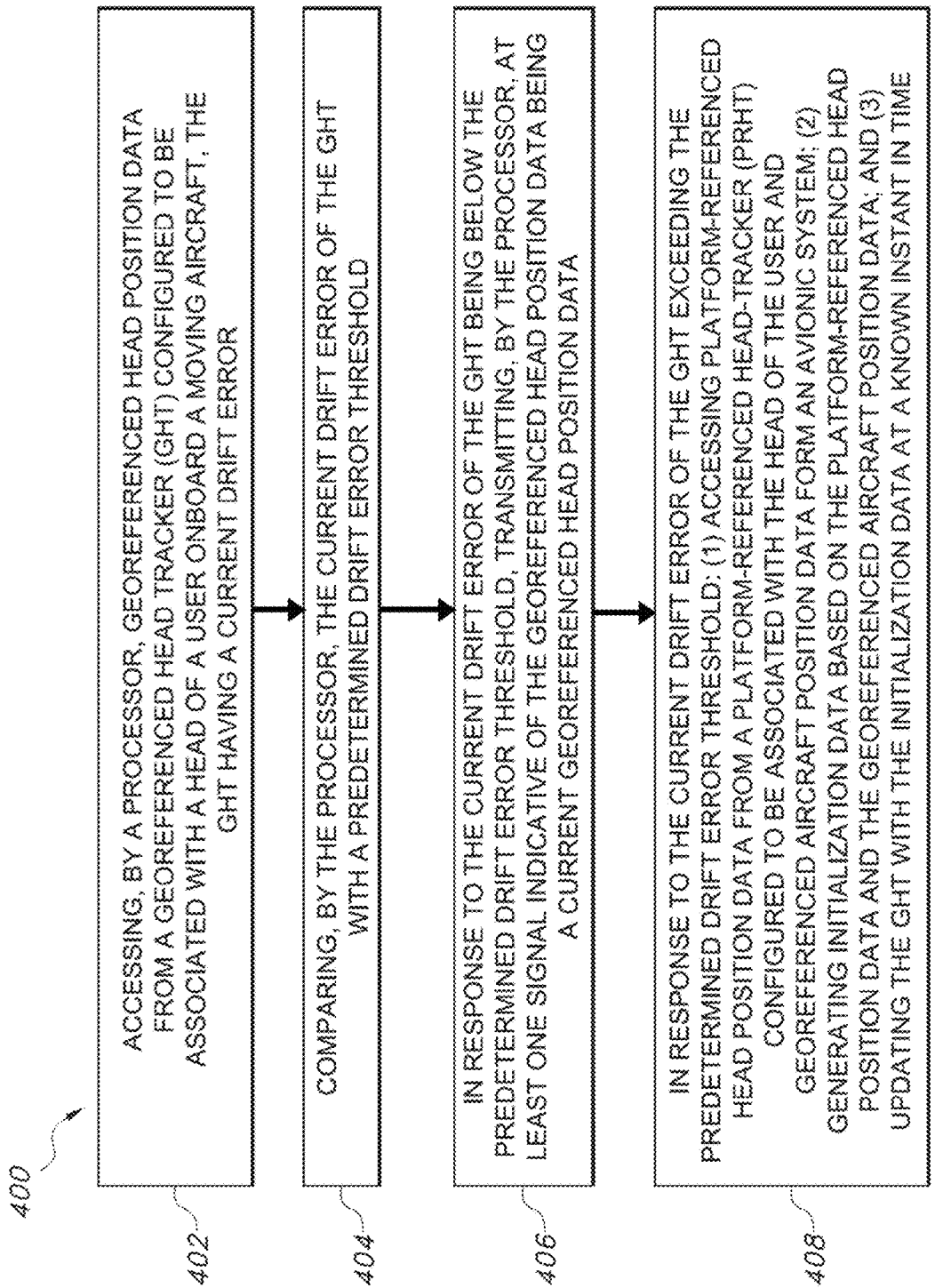
FIG. 4 is a diagram of an embodiment of a method of providing georeferenced head position data according to the inventive concepts disclosed herein.

Referring now to FIG. 4, shown therein is an embodiment of a method 400 for providing a georeferenced position of a head of a user.

In a step 402 a processor executing processor-executable code stored in a non-transitory processor-readable medium may access georeferenced head position data from a georeferenced head tracker (GHT) configured to be associated with a head of a user onboard a moving aircraft, the GHT having current drift error.

In a step 404, the processor may compare the current drift error of the GHT with a predetermined drift error threshold. The current drift error of the GHT may be determined based on the time-cumulative drift error of the GHT and a period of time elapsed from a last known update of the GHT in some embodiments.

In a step 406, in response to the current drift error of the GHT being below the predetermined drift error threshold, the processor may transmit a signal indicative of the georeferenced head position data being a current georeferenced head position data.

In a step 408, in response to the current drift error of the GHT exceeding the predetermined drift error threshold, the processor may access platform-referenced head position data from a platform-referenced head-tracker (PRHT) configured to be associated with the head of the user and georeferenced aircraft position data from at least one aircraft or avionics system onboard the moving aircraft, generate update data based on the platform-referenced head position data and the georeferenced aircraft position data, and initialize or update the GHT with the update data at a known instant in time. The processor may time the data from the GHT, the data from the PRHT, and the data from the avionics system to compensate for processing and other delays and synchronize the data to ensure head position data used by the processor from the various sources is from the same instant in time.

The update data may have an update magnitude, amount, or value (e.g. expressed as a drift correction vector, or an error correction factor or coefficient). The processor may compare the update magnitude with a predetermined fault detection update magnitude threshold. In response to the update magnitude exceeding the predetermined fault detection update magnitude threshold, the processor may determine a fault condition exists. In response, the processor may undertake one or more of a variety of actions, such as providing user notification, providing fault notification to one of more avionic system, providing a fault notification to a remote processor, reporting the last known good head position, suppressing faulty head position data, shutting down the head-tracking system, or combinations thereof. The processor may continuously or intermittently monitor the data for faults. The fault detection update magnitude threshold may be determined based on the relatively error expected from a normally functioning system (e.g., a combination of the drift error of the GHT, and the error of the PRHT) at the applicable update rate (e.g., in Hz).

In some embodiments, the PRHT may include optical platform-referenced head position data from an optical head tracker configured to be associated with the head of the user. Further, in some embodiments the PRHT may include magnetic platform-referenced head position data from a magnetic head tracker (MHT) configured to be associated with the head of the user. In some cases, the processor may access a magnetic calibration map indicative of a magnetic environment in a region surrounding the head of the user; and may calibrate the MHT based on the magnetic calibration map.

It is to be understood that embodiments of methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head-tracking system, comprising:
    a georeferenced head tracker (GHT) configured to be associated with a head of a user and to provide georeferenced head position data, the GHT having a current drift error;
    a platform-referenced head-tracker (PRHT) configured to be associated with the head of the user and to provide platform-referenced head position data;
    a controller coupled with the GHT and the PRHT, and configured to be coupled with at least one avionic system configured to provide georeferenced aircraft position data, the controller including at least one processor coupled with a non-transitory processor-readable medium storing processor-executable code for causing the at least one processor to:
    access the georeferenced head position data;
    compare the current drift error of the GHT with a predetermined drift error threshold;
    in response to the current drift error of the GHT being below the predetermined drift error threshold, transmit at least one signal indicative of the georeferenced head position data being a current georeferenced head position data;
    in response to the current drift error of the GHT exceeding the predetermined drift error threshold, access the georeferenced aircraft position-data and generate update data based on the platform-referenced head position data and the georeferenced aircraft position data; and
    update the GHT with the update data at a known instant in time
    wherein the PRHT comprises a magnetic head tracker (MHT) configured to provide magnetic platform-referenced head position data, and wherein the non-transitory processor-readable medium further stores processor-executable code for causing the at least one processor to: in response to the current drift error of the GHT exceeding the predetermined drift error threshold, generate update data based on the magnetic platform-referenced head position data and the georeferenced aircraft position data;
    wherein the non-transitory processor-readable medium further stores processor-executable code for causing the at least one processor to: access a magnetic calibration map indicative of a magnetic environment in a region surrounding the head of the user; and calibrate the MHT based on the magnetic calibration map;
    wherein the non-transitory processor-readable medium further stores processor-executable code for causing the at least one processor to at least one of: dynamically update the magnetic calibration map and periodically update the magnetic calibration map.

2. The head-tracking system of claim 1, wherein the non-transitory processor-readable medium further stores processor-executable code for causing the at least one processor to determine the current drift error of the GHT based on a period of time elapsed from the last known update of the GHT.

3. The head-tracking system of claim 1, wherein the update data includes an update magnitude and wherein the non-transitory processor-readable medium further stores processor-executable code for causing the at least one processor to:
    compare the update magnitude with a predetermined fault detection update magnitude threshold; and in response to the update magnitude exceeding the predetermined fault detection update magnitude threshold, determine a fault condition exists; and at least one of: provide some fault recovery.

4. The head-tracking system of claim 1, wherein the at least one processor is configured to be coupled with a head-worn display, and wherein the non-transitory processor-readable medium further stores processor-executable code for causing the at least one processor to transmit the at least one signal indicative of the current georeferenced head position data to the head-worn display.

5. The head-tracking system of claim 1, wherein the PRHT comprises an optical head tracker configured to provide optical platform-referenced head position data and wherein the non-transitory processor-readable medium further stores processor-executable code for causing the at least one processor to:

in response to the current drift error of the GHT exceeding the predetermined drift error threshold, generate update data based on the optical platform-referenced head position data and the georeferenced aircraft position data.

6. The head-tracking system of claim 1, wherein the PRHT comprises an optical head-tracker (OHT) configured to provide platform-referenced optical head position data, and a magnetic head-tracked (MHT) configured to provide platform-referenced magnetic head-position data, and wherein the non-transitory processor-readable medium further stores processor-executable code for causing the at least one processor to:

in response to the current drift error of the GHT exceeding the predetermined drift error threshold, generate update data based on the georeferenced aircraft position data and at least one of: the optical platform-referenced head position data and the magnetic platform-referenced head position data.

7. A head-tracking system, comprising:

a georeferenced head tracker (GHT) configured to be associated with a head of a user and to provide georeferenced head position data, the GHT having a current drift error;

an optical head-tracker (OHT) configured to be associated with the head of the user and to provide optical platform-referenced head position data;

a magnetic head-tracker (MHT) configured to be associated with the head of the user and to provide magnetic platform-referenced head position data;

a controller coupled with the GHT, the OHT, and the MHT, and configured to be coupled with at least one avionic system configured to provide georeferenced aircraft position data, the controller including at least one processor coupled with a non-transitory processor-readable medium storing processor-executable code for causing the at least one processor to:

access the georeferenced head position data and compare the current drift error of the GHT with a predetermined drift error threshold;

in response to the current drift error of the GHT being below the predetermined drift error threshold, transmit at least one signal indicative of the georeferenced head position data being a current georeferenced head position data; and in response to the current drift error of the GHT exceeding the predetermined drift error threshold, generate update data based on the georeferenced aircraft position data and at least one of: the optical platform-referenced head position data and the magnetic platform-referenced position data; and update the GHT with the update data at a known instant in time wherein the non-transitory processor-readable medium further stores processor-executable code for causing the at least one processor to: access a magnetic calibration map indicative of a magnetic environment in a region surrounding the head of the user; and calibrate the MHT based on the magnetic calibration map;

wherein the non-transitory processor-readable medium further stores processor-executable code for causing the at least one processor to at least one of: dynamically update the magnetic calibration map and periodically update the magnetic calibration map.

8. The head-tracking system of claim 7, wherein the non-transitory processor-readable medium further stores processor-executable code for causing the at least one processor to determine the current drift error of the GHT based on a period of time elapsed from the last known update of the GHT.

9. The head-tracking system of claim 7, wherein the update data includes an update magnitude and wherein the non-transitory processor-readable medium further stores processor-executable code for causing the at least one processor to:

compare the update magnitude with a predetermined fault detection update magnitude threshold; and in response to the update magnitude exceeding the predetermined fault detection update magnitude threshold, determine a fault condition exists; and at least one of: provide some fault recovery.

10. The head-tracking system of claim 7, wherein the at least one processor is configured to be coupled with a head-worn display, and wherein the non-transitory processor-readable medium further stores processor-executable code for causing the at least one processor to transmit the at least one signal indicative of the current georeferenced head position data to the head-worn display.

11. A method of providing georeferenced head position data, comprising:

accessing, by at least one processor executing processor-executable code stored in a non-transitory processor-readable medium, georeferenced head position data from a georeferenced head tracker (GHT) configured to be associated with a head of a user onboard a moving aircraft, the GHT having a current drift error;

comparing, by the at least one processor, the current drift error of the GHT with a predetermined drift error threshold;

in response to the current drift error of the GHT being below the predetermined drift error threshold, transmitting, by the at least one processor, at least one signal indicative of the georeferenced head position data being a current georeferenced head position data;

in response to the current drift error of the GHT exceeding the predetermined drift error threshold:

accessing, by the at least one processor, platform-referenced head position data from a platform-referenced head-tracker (PRHT) configured to be associated with the head of the user and georeferenced aircraft position data from at least one avionic system;

generating, by the at least one processor, update data based on the platform-referenced head position data and the georeferenced aircraft position data; and updating, by the at least one processor, of the GHT with the update data at a known instant in time wherein accessing, by the at least one processor, platform-referenced head position data further comprises accessing magnetic platform-referenced head position data from a magnetic head tracker (MHT) configured to be associated with the head of the user;

accessing, by the at least one processor, a magnetic calibration map indicative of a magnetic environment in a region surrounding the head of the user; and calibrating, by the at least one processor, the MHT based on the magnetic calibration map.

12. The method of claim 11, wherein the update data includes an update magnitude, further comprising:

comparing, by the at least one processor, the update magnitude with a predetermined fault detection update magnitude threshold;

in response to the update magnitude exceeding the predetermined fault detection update magnitude threshold, determining, by the at least one processor, that a fault condition exists; and at least one of: provide some fault recovery.

13. The method of claim 11, wherein accessing, by the at least one processor, platform-referenced head position data further comprises accessing optical platform-referenced head position data from an optical head tracker configured to be associated with the head of the user.

* * * * *